US012328525B2

United States Patent
Rodriguez et al.

(10) Patent No.: US 12,328,525 B2
(45) Date of Patent: Jun. 10, 2025

(54) REFRIGERATION SYSTEM WITH TEMPERATURE MONITORING

(71) Applicant: Hill Phoenix, Inc., Conyers, GA (US)

(72) Inventors: Adrian Rodriguez, Santa Clarita, CA (US); Francisco Flores, Valencia, CA (US); Naresh Kumar Krishnamoorthy, Kerala (IN); Shobin Balakrishnan, Bengaluru (IN)

(73) Assignee: Hill Phoenix, Inc., Conyers, GA (US)

( * ) Notice: Subject to any disclaimer, the term of this patent is extended or adjusted under 35 U.S.C. 154(b) by 25 days.

(21) Appl. No.: 18/198,592

(22) Filed: May 17, 2023

(65) Prior Publication Data

US 2024/0214514 A1 Jun. 27, 2024

(30) Foreign Application Priority Data

Dec. 23, 2022 (IN) .............................. 202241075042

(51) Int. Cl.
| | | |
|---|---|---|
| *G06V 20/00* | (2022.01) | |
| *A47F 3/04* | (2006.01) | |
| *G01J 5/00* | (2022.01) | |
| *G06V 20/52* | (2022.01) | |
| *G06V 20/68* | (2022.01) | |
| *H04N 5/33* | (2023.01) | |

(52) U.S. Cl.
CPC ............ *H04N 5/33* (2013.01); *A47F 3/0426* (2013.01); *G01J 5/0066* (2013.01); *G06V 20/52* (2022.01); *G06V 20/68* (2022.01); *G01J 2005/0077* (2013.01)

(58) Field of Classification Search
CPC ... H04N 5/33; A47F 3/0426; A47F 2010/025; G01J 5/0066; G01J 2005/0077; G06V 20/52; G06V 20/68
See application file for complete search history.

(56) References Cited

U.S. PATENT DOCUMENTS

| | | | | |
|---|---|---|---|---|
| 6,459,919 B1 * | 10/2002 | Lys | ........................ | H05B 47/18 |
| | | | | 600/407 |
| 6,919,795 B2 * | 7/2005 | Roseen | ................ | G06Q 10/087 |
| | | | | 340/568.1 |
| 7,604,378 B2 * | 10/2009 | Wolf | .................... | H05B 45/325 |
| | | | | 362/85 |
| D606,029 S * | 12/2009 | Chou | ........................... | D13/169 |
| 7,630,776 B2 * | 12/2009 | Harwood | ................ | H04R 27/00 |
| | | | | 455/13.1 |
| 7,638,808 B2 * | 12/2009 | Owen | ..................... | H01L 33/60 |
| | | | | 257/E25.02 |

(Continued)

*Primary Examiner* — Frank F Huang
(74) *Attorney, Agent, or Firm* — Fish & Richardson P.C.

(57) ABSTRACT

Methods, systems, and apparatus, including computer programs encoded on a computer storage medium, for determining if a product in a refrigerated display case has likely spoiled. The method can include: obtaining, from one or more thermal cameras installed in a refrigerated case, multiple images of the inside of the refrigerated case; determining, based on the multiple images, a surface temperature of one or more products contained in the refrigerated case; determining that the surface temperature of at least one product violated a spoilage temperature for a period of time; and in response to determining that the surface temperature of at least one product violated a spoilage temperature for a period of time, providing, for display on a user computing system, a graphical interface indicating that the product is likely spoiled.

19 Claims, 5 Drawing Sheets

(56) References Cited

U.S. PATENT DOCUMENTS

| | | | | |
|---|---|---|---|---|
| 7,903,838 B2* | 3/2011 | Hudnut | | A47J 37/00 |
| | | | | 382/100 |
| 8,441,534 B2* | 5/2013 | Hubmer | | G08B 21/0275 |
| | | | | 707/791 |
| 8,690,273 B2* | 4/2014 | Dolinsek | | F25D 23/065 |
| | | | | 312/401 |
| 8,756,942 B2* | 6/2014 | Min | | F25D 29/00 |
| | | | | 62/62 |
| 8,912,905 B2* | 12/2014 | Wong | | F21V 23/003 |
| | | | | 340/572.4 |
| 8,935,938 B2* | 1/2015 | Krause | | F25D 23/126 |
| | | | | 62/331 |
| 9,024,716 B2* | 5/2015 | Yum | | G06Q 10/087 |
| | | | | 340/3.7 |
| 9,173,188 B2* | 10/2015 | Miyawaki | | H04W 64/00 |
| 9,357,873 B2* | 6/2016 | Reyhanloo | | A47J 31/4485 |
| 9,412,086 B2* | 8/2016 | Morse | | G06K 7/1417 |
| 9,545,930 B2* | 1/2017 | Ricci | | G01C 21/3484 |
| 2002/0066279 A1* | 6/2002 | Kiyomatsu | | H04L 67/12 |
| | | | | 62/125 |
| 2008/0278324 A1* | 11/2008 | Uchimura | | G01S 5/16 |
| | | | | 340/572.1 |
| 2010/0170289 A1* | 7/2010 | Graziano | | F25D 23/02 |
| | | | | 62/449 |
| 2010/0225484 A1* | 9/2010 | Van De Sluis | | G01S 1/7034 |
| | | | | 340/572.4 |
| 2012/0241043 A1* | 9/2012 | Perazzo | | A61J 7/0053 |
| | | | | 141/2 |
| 2014/0043433 A1* | 2/2014 | Scavezze | | G02B 27/0172 |
| | | | | 348/42 |
| 2014/0232866 A1* | 8/2014 | Lee | | H04N 7/18 |
| | | | | 348/143 |
| 2014/0313693 A1* | 10/2014 | Seo | | F25D 27/005 |
| | | | | 362/94 |
| 2014/0320647 A1* | 10/2014 | Seo | | F25D 29/00 |
| | | | | 348/143 |
| 2015/0267960 A1* | 9/2015 | Cheon | | F25D 29/005 |
| | | | | 62/127 |
| 2016/0033194 A1* | 2/2016 | Sumihiro | | F25D 23/04 |
| | | | | 62/125 |
| 2016/0088262 A1* | 3/2016 | Lee | | G06F 3/167 |
| | | | | 704/275 |

* cited by examiner

REFRIGERATION SYSTEM WITH TEMPERATURE MONITORING

CROSS-REFERENCE TO RELATED APPLICATION

This application claims the benefit of priority to Indian Patent Application Number 202241075042, filed Dec. 23, 2022, the contents of which is hereby incorporated by reference.

TECHNICAL FIELD

The present specification relates to refrigerated display cases.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more thermally insulated doors or windows for viewing and accessing refrigerated or frozen objects within a temperature-controlled space. Doors for refrigerated enclosures generally include thermally insulated glass panel assemblies.

Sending messages about the contents of the refrigerated display to a user, e.g., a grocery store manager, can be an effective way to communicate information about the status of a product in the refrigerated display case.

SUMMARY

Maintaining consumable goods within precise temperature ranges can prevent spoilage. However, several factors in a grocery store or similar setting can cause the temperature of a product to deviate from the desired temperature. For example, shoppers may open doors enclosing refrigerated goods, causing the temperature to fluctuate. An ability to regularly check or monitor the temperature of products within a refrigerated or freezer display case can help prevent spoilage by providing real time temperature information about individual products.

A system and method for monitoring temperatures of individual products is disclosed herein. In some implementations, such a system can also determine whether a product is likely to have spoiled. The system can include a display case, e.g., a refrigerated display case that contains and controls the temperature of products within the case and includes a display screen that depicts the products. Heating and cooling devices can affect the temperature of the interior of the display case. In some implementations, a door can allow access to the contents of the display case. In some implementations, the display can be mounted on top of the case containing refrigerated goods. The display case can include internal, external, or both types of cameras facing the products, shoppers, or both. The display case can be connected to a computing system, e.g., a server.

A thermal camera installed in a refrigerated case can obtain multiple images of various products inside the refrigerated case. A processor can determine the surface temperature of the products using the images. The processor can then determine whether at least one product has violated the spoilage temperature for a period of time. In response to determining that at least one product has potentially spoiled, the processor can provide an indication of the spoiled product in a user interface.

In some implementations, the processor accesses data including, but not limited to, a planogram, a database with spoilage temperatures, a spectroscopy database, or a combination of these. Each type of product can have predefined spoilage temperature and time ranges, indicating how long the product can stay above or below certain temperatures before spoiling.

In general, innovative aspects of the subject matter described in this specification can be embodied in methods that include the actions of: obtaining, from one or more thermal cameras installed in a refrigerated case, multiple images of the inside of the refrigerated case; determining, based on the multiple images, a surface temperature of one or more products contained in the refrigerated case; determining that the surface temperature of at least one product violated a spoilage temperature for a period of time; and in response to determining that the surface temperature of at least one product violated a spoilage temperature for a period of time, providing, for display on a user computing system, a graphical interface indicating that the product is likely spoiled.

These and other implementations can each optionally include one or more of the following features.

In some implementations, determining the surface temperature of the one or more products includes: identifying multiple pixels associated with a product within at least one image of the multiple images; and determining a surface temperature of the product based on values of the multiple pixels.

In some implementations, determining the surface temperature of the product includes determining an average of the values of the multiple pixels; and determining a temperature value associated with the average.

In some implementations, determining that the surface temperature of at least one product violated a spoilage temperature for a period of time includes: determining, from the multiple images, a location of the at least one product within the refrigerated display case; determining a type of the at least one product based on comparing the location of the at least one product to a planogram of the refrigerated case; and determining the that the surface temperature of the at least one product violated a spoilage temperature associated with the type of the at least one product.

In some implementations, determining that the surface temperature of the at least one product violated the spoilage temperature associated with the type of the at least one product includes: identifying multiple pixels associated with the at least one product within a subset of images of the multiple images; determining a surface temperature of the at least one product based on values of the multiple pixels; determining that the surface temperature violated the spoilage temperature in more than one of the images of the subset of images; and determining the time period that the surface temperature of at least one product violated the spoilage temperature based on a number of the images in which the surface temperature violated the spoilage temperature and timestamps associated with each image.

In some implementations, determining that the surface temperature of the at least one product violated a spoilage temperature associated with the type of the at least one product includes: accessing a database including spoilage temperatures for multiple different products; and identifying the spoilage temperature associated with the type of the at least one product within the database.

In some implementations, the method can further include generating, from the multiple images, a profile of surface temperatures within the refrigerated case over a period of time.

In some implementations, generating the profile of surface temperatures within the refrigerated case over a period of time includes: determining, based on pixel values within a first image, surface temperatures of products within the refrigerated display case at a first time that is associated with the first image; and determining, based on pixel values within a second image, surface temperatures of products within the refrigerated display case at a second time that is associated with the second image.

In some implementations, the method can further include presenting, on a display associated with the refrigerated case, a graphical representation of surface temperatures within the refrigerated case overlaid on an image of a planogram of products within the refrigerated display case.

In some implementations, the method can further include including controlling a robotic device associated with the refrigerated display case to remove the product that is likely spoiled.

Particular implementations of the subject matter described in this specification can be implemented so as to realize one or more of the following advantages. A user interface can provide accurate and real-time information about consumable goods, helping to prevent the spoilage of consumable goods and protect consumers from spoiled goods. In some implementations, the use of a planogram can reduce an amount of computer processing and memory used to identify a product and determine whether the product has likely spoiled. In some implementations, an amount of energy expended to maintain refrigerated goods within a predetermined temperature range be reduced, as real time temperature data might indicate no need to provide cooling air Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
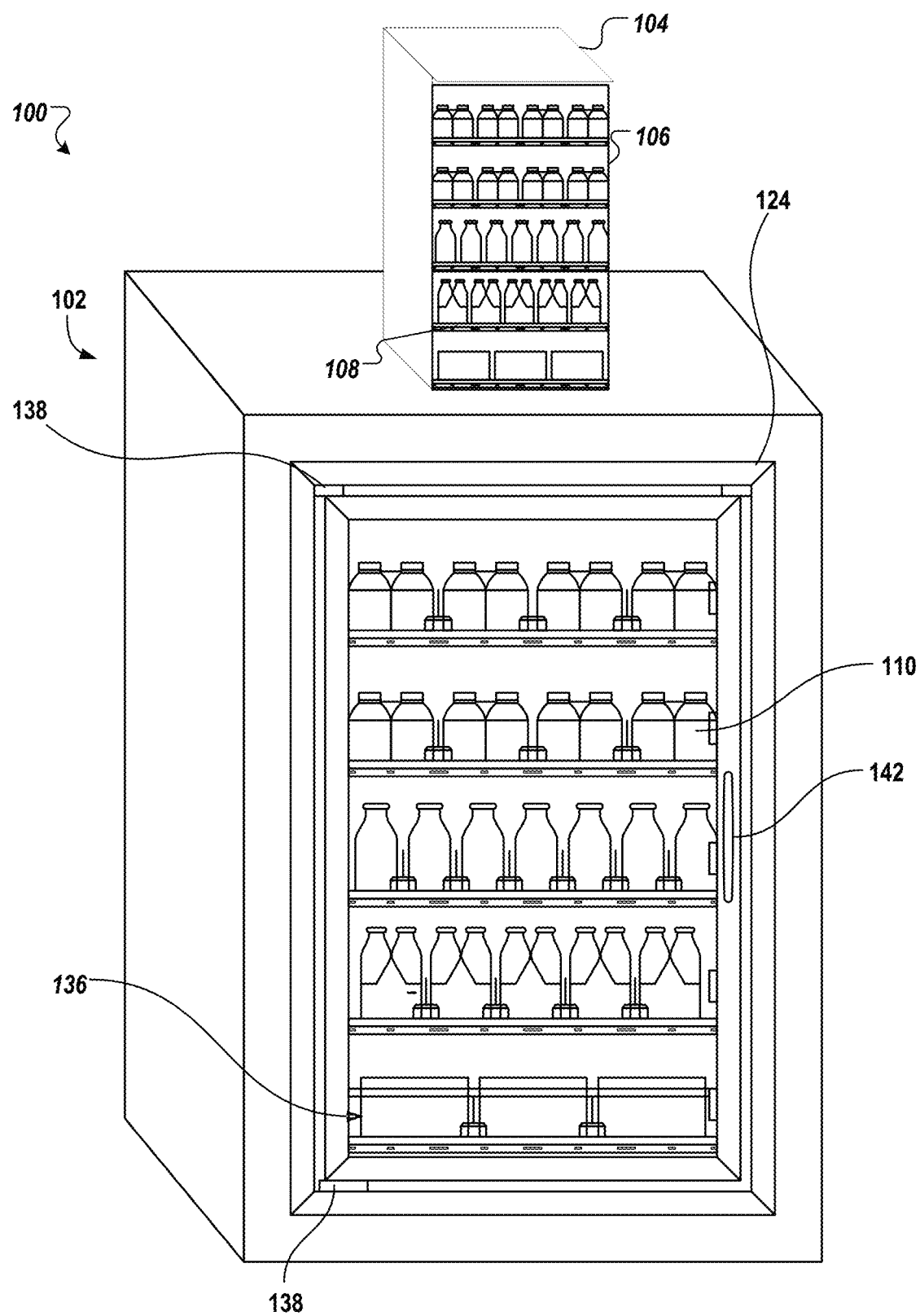
FIG. 1 is a perspective view of a refrigerated display case system.

FIG. 1 is a perspective view of a refrigerated display case system 100. The refrigerated display case system 100 can include a refrigerated enclosure 102, which can be a refrigerator, freezer, or other enclosure defining a temperature-controlled space. In some implementations, the refrigerated enclosure 102 includes a refrigerated display case. For example, the refrigerated enclosure 102 can be a refrigerated display case e.g., refrigerated merchandiser in grocery stores, supermarkets, convenience stores, florist shops, and/or other commercial settings to store and display temperature-sensitive consumer goods (e.g., food products and the like) The refrigerated enclosure 102 can be used to display products that must be stored at relatively low temperatures and can include shelves, glass doors, and/or glass walls to permit viewing of the products supported by the shelves. In some implementations, the refrigerated enclosure 102 is a refrigerated storage unit used, for example, in warehouses, restaurants, and lounges. The refrigerated enclosure 102 can be a free standing unit or "built in" unit that forms a part of the building in which the refrigerated enclosure 102 is located.

The refrigerated enclosure 102 can include one or more doors 136 pivotally mounted on a thermal frame 124 by hinges 138. In some implementations, the doors 136 are sliding doors configured to open and close by sliding relative to the thermal frame 124. A user can open the door 136 by sliding or pulling a handle 142, depending on the type of the door 136.

The refrigerated display case system 100 can include a display 110 on the front of the refrigerated enclosure 102. For example, the display 110 can be mounted to a door 136 of the refrigerated enclosure 102 In some implementations, a display case 104 with display 106 can be mounted on top of the refrigerated enclosure 102 or located elsewhere relative to the refrigerated enclosure 102. Either display 110 or 106 can be used to present images such as representations of products 108 that are in the refrigerated enclosure 102 (e.g., a graphical planogram), advertisements, or other information. For example, the representations of products 108 can include a visual representation of the product, e.g., a graphic or photo, the name of the product, and information regarding the status of the product including, but not limited to, the temperature of the product, the expiration date of the product, and the spoilage status of the product. More features of the display 106, including details of when a display is located on the front of the refrigerated enclosure 102, will be described in the discussion of FIG. 4.

Figure 2:
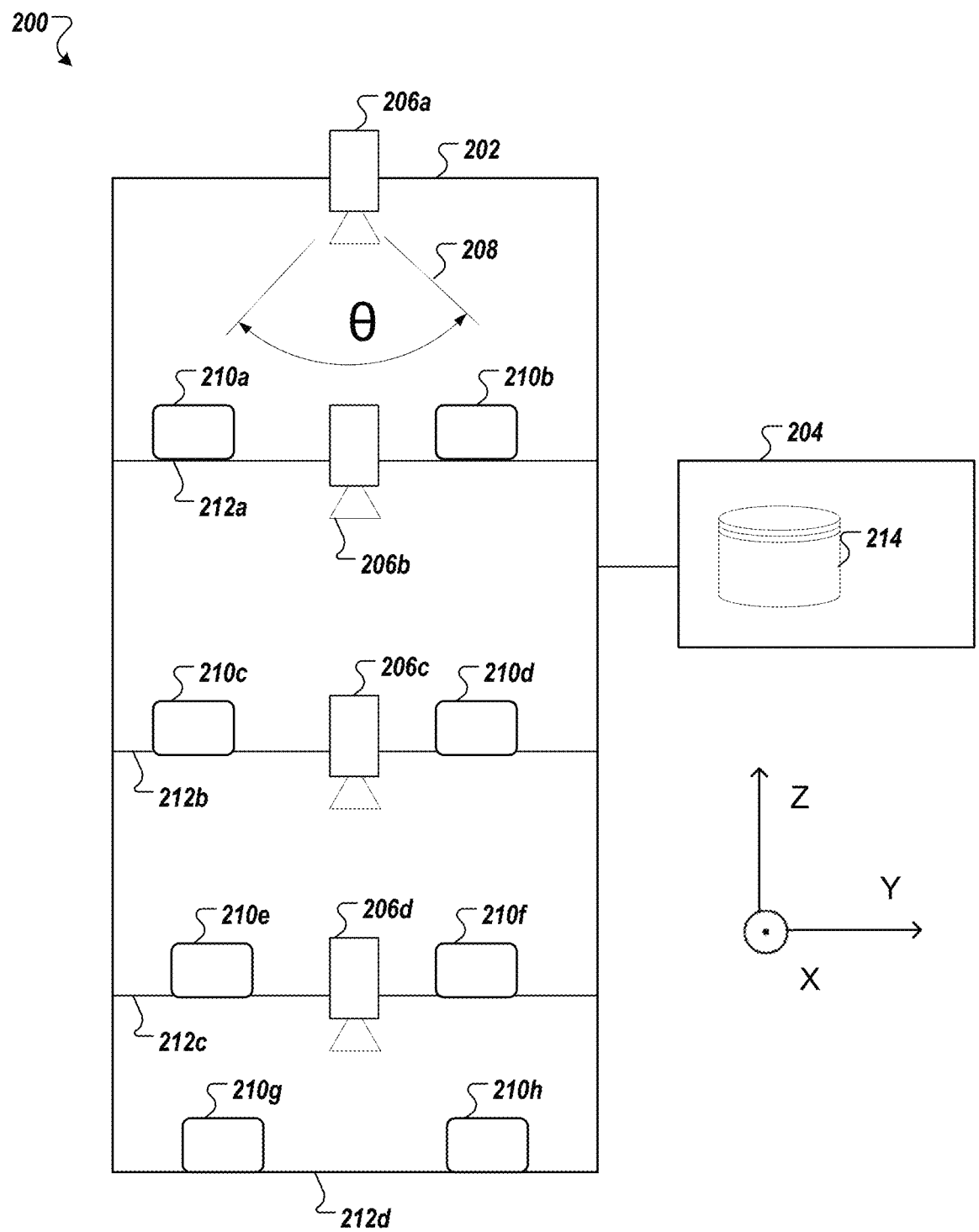
FIG. 2 is a schematic of a temperature monitoring system.

FIG. 2 is a schematic of a temperature monitoring system 200 inside a refrigerated enclosure 202. The temperature monitoring system 200 can include, but is not limited to, thermal cameras 206a-d and a controller 204. The refrigerated enclosure 202 includes products 210a-h located on shelves 212a-d. In general, the temperature monitoring system 200 collects thermal images of the products 210 within the refrigerated enclosure 202 using thermal cameras 206 and analyzes the images to ensure the products 210 are maintained at proper storage temperatures. For example, a temperature monitoring system 200 installed in a grocery store freezer case can be used to monitor the temperature of frozen products stored in the case. Using the thermal images, rather than a traditional thermometer or thermocouple, the system 200 can monitor the temperature of each individual product within the field of view of each camera to ensure each product is marinated at a proper storage temperature.

The shelves 212a-d have different heights along the Z direction within the refrigerated enclosure 202. For example, shelf 212d can be nearest to the ground, while shelf 212a is at the greatest height. The temperature monitoring system 200 includes thermal cameras 206, which can have various locations within the refrigerated enclosure 202. For example, thermal cameras 206 can be located on shelves, doors, walls, or a combination thereof, of the refrigerated enclosure 202.

The temperature monitoring system 200 uses each thermal camera 206 to measure temperatures of products within its field of view. For example, each camera 206 captures thermal images of products within its field of view. The values of individual pixels in the thermal images relate to measurements of the temperature of each product. For example, thermal camera 206a can be angled downward facing shelf 212a, which houses products 210a and 210b. The field of view of thermal camera 206a can be expressed as an angular spread 208. Products 210a and 210b fall within the angular spread 208, thus thermal camera 206a can measure the temperatures of products 210a and 210b. Shelf 212b blocks the rest of the products from the field of view of thermal camera 206a.

In some implementations, the thermal cameras 206 can be located different depths within the refrigerated enclosure 202. For example, some can be further back within the refrigerated enclosure when looking along the X direction. For example, a first thermal camera can be close to a door that allows access to the refrigerated enclosure 202, and a second thermal camera can be further away from the door. In some implementations, the thermal cameras 206 can be angled backwards in the refrigerated enclosure 202, facing different rows of the products 210. In some implementations, the thermal cameras 206 can be located along one or more shelves 212, e.g., along the Y direction.

In some implementations, the temperature monitoring system 200 includes multiple thermal cameras 206, even when one thermal camera, e.g., thermal camera 206a, can monitor every product 210. In some implementations, using multiple thermal cameras 206 can improve the accuracy of temperature readings.

In some implementations, each camera thermal 206a-d can have substantially the same angular spread, such as a fish eye lens with 170°±1° angular spread. In some implementations, some of the thermal cameras, e.g., thermals cameras 206a and 206b, have the same angular spread 208, while the others, e.g., thermal camera 206c and 206d, do not. In some implementations, each thermal camera 206a-c can have its own unique angular spread 208.

The thermal cameras 206 collect thermal images by detecting infrared radiation emitted by the products 210. The infrared images of products 220 received by the cameras 206 can be correlated to the surface temperature of the product 210. The thermal cameras 206 can detect and record data about the wavelength and intensity of radiation coming from different points in the field of view of the camera. The pixels of each thermal image can have values that correlate to the temperature of the product 210.

The thermal cameras 206 pass the images to a controller 204. In some implementations, the controller 204 can compare the images to a database 214, which can include typical radiation profiles of product types for various temperatures. For example, the controller 204 can create a histogram of pixel values from the images and use the most common bin in the histogram to determine a likely temperature of the product in the image. Then the controller 204 can compare the likely temperature to ideal temperature ranges for the product.

In some implementations, the thermal profile of a product will not be uniform, e.g., the wavelength and intensity of the radiation will not be the same for every pixel representing the product. In some implementations, the controller 204 carries out calculations, e.g., computes an average value of the pixels representing the product, according to software stored on the controller 204, in order to determine a likely surface temperature of an area within the refrigerated enclosure 202 corresponding to a product 210. In some implementations, the controller 204 uses multiple images in its calculations to determine the surface temperature of a product 210.

Figure 3:
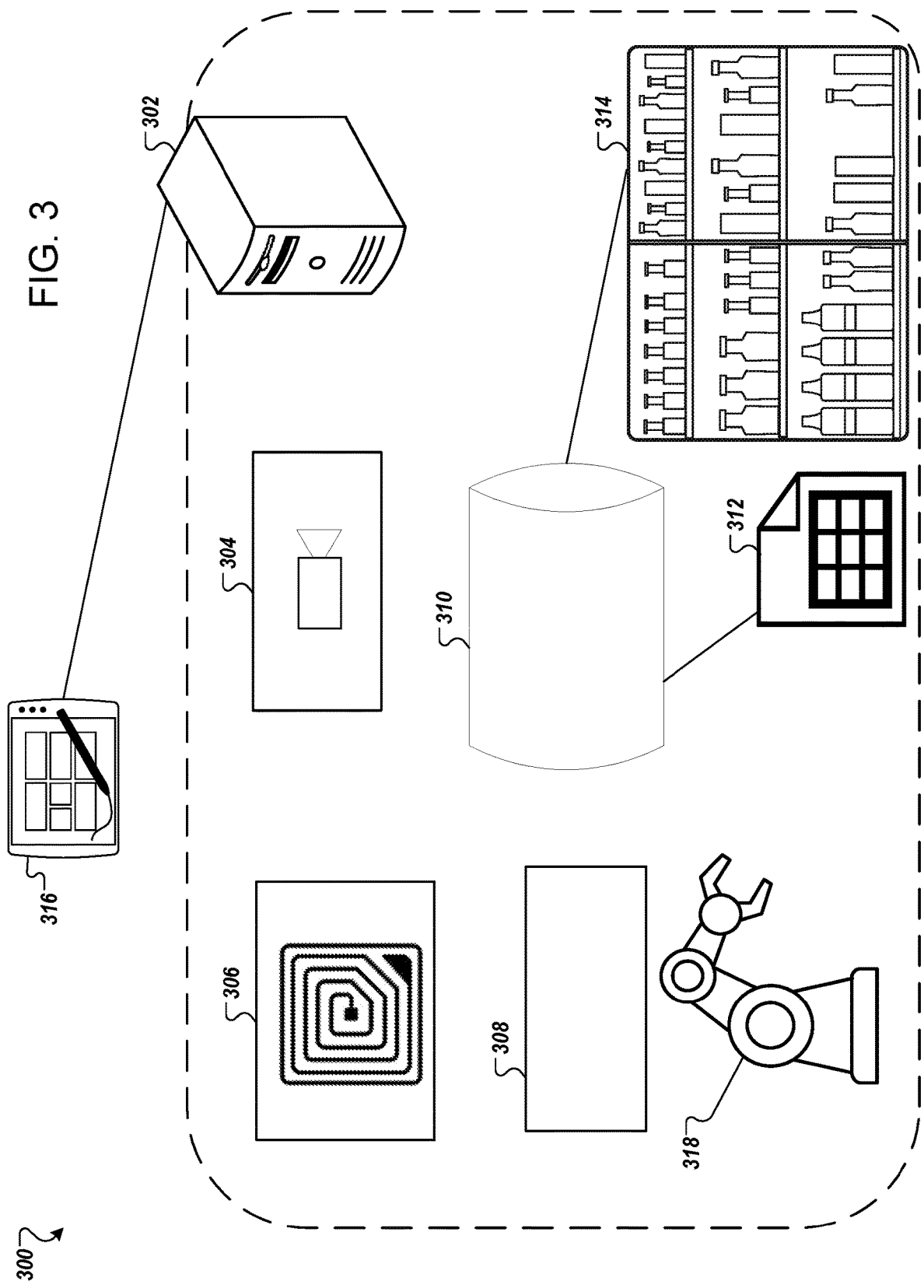
FIG. 3 depicts an environment for monitoring the temperature of products within a refrigerated display case system.

FIG. 3 depicts an environment 300 for monitoring the temperature of products within a refrigerated display case system. The environment 300 can include a processor 302, a thermal camera 304, other types of sensors 306, e.g., radio frequency identification (RFID) readers, a refrigerated enclosure 308, memory 310, and a user device 316. In some implementations, the controller 204 houses the processor 302.

The controller 204 can determine to which product 210 an area within the refrigerated enclosure 308 corresponds in various ways. In some implementations, each product 210 includes a tag in a predetermined location that indicates the product type of the product 210. For example, product 210e can include an RFID tag with an appropriate identifier on the bottom of the product 210e, which indicates that product 210e is yogurt. When the processor 302 processes data collected by thermal camera 206c, the controller 204 can determine that product 210e is yogurt, by detecting the tag with the appropriate identifier. A database 312 can include information about each type of tag, such as the size, e.g., the dimensions, of the product 210e, so that the controller 204 can identify how much of an image, collected by the thermal camera 206c corresponds to product 210e, e.g., which pixels of the image are associated with the product 210e.

In some implementations, the controller 204 can use image processing to determine the product type of products 210. For example, thermal camera 206c can collect thermal images that capture products 210e and 210f. The processor 302 can execute a program that can detect outlines of objects, so that the controller 204 can determine the shape of various products within a thermal image. The program can use machine learning, computer vision, artificial intelligence, and the like for object detection. For example, the processor 304 can execute a program that can recognize text and identify product types by their name.

As another example, the controller 204 can determine that an outline in a thermal image collected by thermal camera 206c corresponds to a carton of milk and that another outline in the same thermal image corresponds to a jug of juice. Consequently, the controller 204 can determine that the area in the thermal image within an outline corresponds to a particular product type. In some implementations, outlines of the products 210 can be obscured in a particular thermal image. In such implementations, the program used in object detection can predict the most likely match between the truncated outline and product type based on the available data.

In some implementations, the controller 204 can determine the product type corresponding to an area in a thermal image using a planogram 314 and information about the location composed of the thermal camera 206 that collected the thermal image. For example, the memory 310 can include a planogram 314, which indicates the organization of product types within the refrigerated enclosure 202. For example, the planogram 314 can indicate the shelf 212d includes ice cream on the left side and popsicles on the right side.

The controller 204 can determine what product types correspond to what areas of the thermal image collected by thermal camera 206d by accessing information about the location and orientation of the thermal camera 206d. In some implementations, the controller 204 accesses this information by querying the database 312. In some implementations, the thermal camera 206d sends this information to the controller 204. The controller 204 can determine what point in space, e.g., the location, an area in the thermal image represents, and then determine the product type of that point in space by reading the planogram 314. For example, the controller 204 can determine that areas on the right side of thermal images collected by thermal camera 260d correspond to ice cream, according to the planogram 314.

In some implementations, the database 312 can include information about temperature conditions that lead to spoilage, e.g., spoilage temperatures, per product type. For example, the database 312 can include information that indicates that milk products should be kept within a range between 34-38° F., and that if the milk product is kept below 32° F. for first duration, it can freeze, damaging the structure of the milk product. Additionally, the database can include information that indicates that if a milk product is above 38° F. for second duration, it can spoil.

The controller 204 can determine whether a product 210 in the refrigerated enclosure 308 has spoiled or is otherwise unfit consumption using the product type of the product and information about the temperature conditions related to that product type. After identifying the product type of a product 210 in the thermal image by one of the above discussed means, the controller 204 can compare the determined temperature of the product with the temperature conditions that lead to spoilage. For example, the controller 204 can determine that product 210d is a carton of eggs with a temperature of 42° F. The database 312 can indicate that cartons of eggs should be kept between 39-41° F.. In some implementations, the controller 204 can determine that the carton of eggs at 42° F. is spoiled, since the temperature falls outside of the ideal range. In some implementations, the controller 204 can check how long the temperature of a product has fallen outside of the ideal range before determining if the product has spoiled. For example, if a carton of eggs has only been at 42° F. for a few minutes, the controller 204 can determine that the carton of eggs is not spoiled, but action should be taken to prevent spoilage. In some implementations, if a temperature is far enough outside of the ideal temperature range, the controller 204 can automatically determine that the product is spoiled, no matter how little time the product is spent at that temperature. For example, if the controller 204 determines that the carton of eggs has a temperature of 60° F., the controller 204 can mark the carton of eggs as unfit for consumption.

In some implementations, the controller 204 can generate a time lapse of the surface temperatures within the refrigerated enclosure 202 over time. For example, the controller 204 can obtain multiple thermal images taken at different times. The controller 204 can determine the surface temperatures of one or more products in a first thermal image, using the pixel values within the first thermal image. Then the controller 204 can repeat this determination of the surface temperature for a second thermal image. The controller 204 can identify corresponding locations within the first and second thermal images and determine a change in temperature for each location over time, thereby generating a surface temperature profile within the refrigerated enclosure 202. In some implementations, the thermal images represent the same area within the refrigerated enclosure 202. In some implementations, a subset of the thermal images represent the same area within the refrigerated enclosure 202, some but not all of the areas represented by thermal images overlap, or a combination thereof.

In some implementations, the controller 204 can determine a likelihood of spoilage of a particular product. The controller 204 can determine a percentage representing the likelihood that a particular product has spoiled using the product type of the product, the temperature of the product, the temperature profile, e.g., the temperature time lapse, of the product, and the like. For example, the controller 204 can determine that a carton of milk has spoiled with a likelihood of 89% if the carton of milk was at a temperature higher than a spoilage temperature for three days. As another example, the controller 204 can determine that a can of soda has spoiled with a likelihood of 3%, even though the temperature was a few degrees higher than the ideal temperature range for soda for a day. In some implementations, the ideal temperature range is different from a spoilage temperature. For example, soda can have an ideal temperature range that is much lower than temperatures that would cause soda to spoil, since soda tends to be enjoyed cold.

The processor 302 can communicate information regarding the temperature, product types, and product status of products 210 within the refrigerated enclosure 308 to a user device 316. The user device 316 can organize this information into a convenient display for a user. For example, the user device 316 can highlight products 210 that the controller 204 has determined to be spoiled. The user device 316 can present recommendations for actions to prevent spoilage of a particular product, such as reducing the temperature within a region of the refrigerated enclosure 308 containing the product, moving the particular product to a different region of the refrigerated enclosure 308, or both. In some implementations, the environment 300 can include robotics 318, configured to aid in the prevention of food spoilage. For example, the robotics 318 can be a robotic arm that can remove a product, rearrange products, or both.

Figure 4:
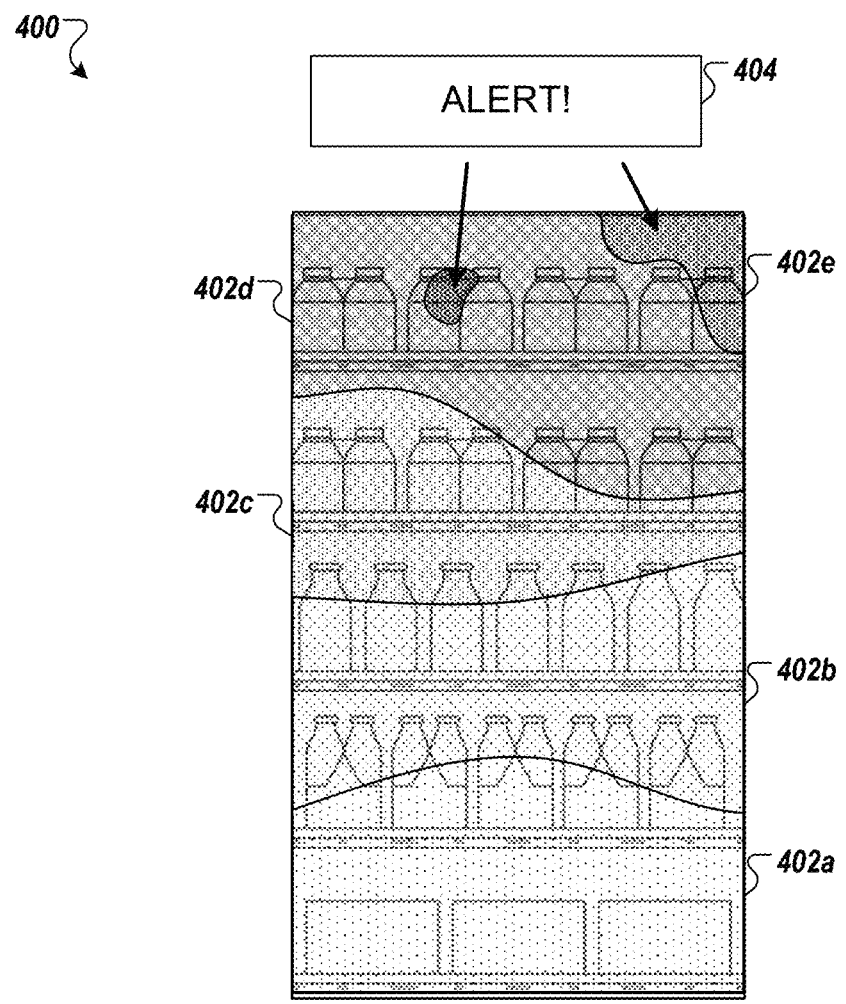
FIG. 4 depicts an example of a display in a refrigerated display case.

FIG. 4 depicts an example of a display 400 in a refrigerated display case. A device such as user device 316 can present this example of a display 400. The display 400 can depict a refrigerated enclosure and its contents. The display 400 can include a graphical representation of temperature, e.g., a temperature field, overlaid on the refrigerated enclosure and its contents. In some implementations, the temperature field corresponds to a gradient which can be broken into different regions based on the temperature at each point in the refrigerated enclosure. For example, a refrigerated enclosure can have an ideal temperature map, where the temperature at the bottom of the refrigerated enclosure is the lowest, and the temperature gradually increases going upward. In reality, the actual temperature throughout the refrigerated enclosure can vary due to a variety of reasons. Consequently, the temperature field 402 can appear as it does in FIG. 4.

At the bottom of the refrigerated enclosure in FIG. 4, the temperature can fall within a first temperature range 402a. Above the region corresponding to temperature range 402a, another region of the refrigerated enclosure can fall within a second temperature range 402b, and so on for temperature ranges 402c and 402d. Some areas of the refrigerated enclosure can have temperatures too high for the product types in those areas. Those areas can have temperatures in a temperature range 402e that trigger an alert 404 on the display 400. In some implementations, temperatures in the temperature range 402e are above a threshold temperature for safe consumption of a product type. The alert 404 can be eye-catching, e.g., have a bright color or be flashing.

In some implementations, the temperature field in the display 400 is overlaid on a planogram of products within the refrigerated enclosure. In some implementations, the temperature field in the display 400 is overlaid on an up to date photograph of the inside of the refrigerated enclosure 202, e.g., a photograph taken by one of the other sensors 306 since the last time a door to the refrigerated enclosure was opened.

Figure 5:
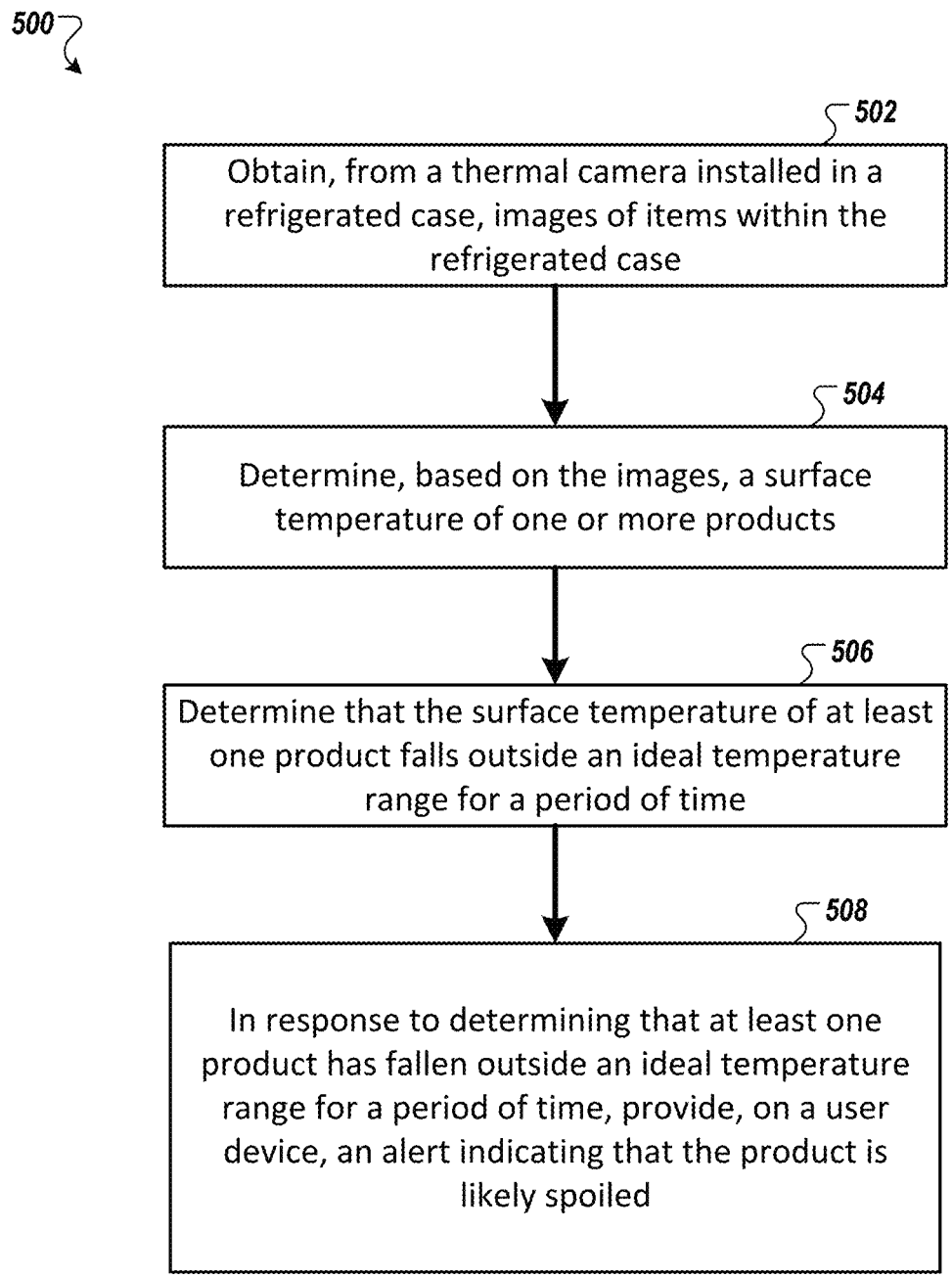
FIG. 5 depicts a flowchart of a method for monitoring the temperature of products within a refrigerated display case system.

FIG. 5 depicts a flowchart of a method for monitoring the temperature of products within a refrigerated display case system. For example, the components of the environment 300 or the temperature monitoring system 200 can carry out the method 500.

The temperature monitoring system 200 can obtain, from a thermal camera 206 installed in a refrigerated case, e.g., refrigerated enclosure 202, images of products 210 within the refrigerated case (502). In some implementations, there are multiple thermal cameras 206, each of which can collect multiple thermal images of products within the refrigerated case. In some implementations, the thermal cameras capture multiple thermal images over a period of time.

The temperature monitoring system 200 can determine, based on the images, a surface temperature of one or more products (504). For example, the processor 302 can analyze data from the thermal images and compare them to a database 312 that matches infrared radiation profiles to surface temperatures, execute calculations using data from the thermal images that determines a likely surface temperature of the products, or both. In some implementations, the determination can involve analyzing values, e.g., intensities and wavelengths, associated with individual pixels in the thermal images.

The temperature monitoring system 200 can determine that the surface temperature of at least one product falls outside an ideal temperature range for a period of time (506). In some implementations, the temperature monitoring system 200 uses multiple thermal images representing the temperature of a region within the refrigerated case over a period of time to determine whether the surface temperature of the product violates a spoilage temperature for a predetermined period of time. In some implementations, the thermal cameras 206 record timing information that allow the controller 204 to determine when a thermal image was captured and periods of time between thermal images of the same area being collected.

In some implementations, determining that the surface temperature of the product falls outside an ideal temperature range can include identifying the product type of the product. Then the temperature monitoring system 200 can determine the ideal temperature range and spoilage temperature according to the product type and compare the determined surface temperature to this ideal temperature range. In some implementations, the surface temperature can violate a spoilage temperature, e.g., the surface temperature can be above or below the ideal temperature range.

The period of time that determines whether a product is spoiled can vary. In some implementations, the period of time can be any amount of time, e.g., once the temperature monitoring system 200 has determined that a product has a temperature that violates spoilage temperature, the temperature monitoring system 200 immediately determines that the product is spoiled. In some implementations, the period of time can be product specific, depend on the difference between the surface temperature and the bounds of the ideal temperature range, or both. For example, if a product is narrowly outside of the ideal temperature range, e.g., a couple degrees Fahrenheit, for short period of time, e.g., a few minutes, the temperature monitoring system 200 can determine that the product is probably not spoiled yet.

In response to determining that at least one product has fallen outside an ideal temperature range for a period of time, the temperature monitoring system 200 can provide, on a user device 316, an alert 404 indicating that the product is likely spoiled (508). In some implementations, the alert 404 can be a visual representation of the surface temperature highlighting areas with alarming temperatures, such as a temperature field.

In some implementations, the method 500 can include additional steps, fewer steps, or some of the steps can be divided into multiple steps. For example, the method 500 can continue with a robotic arm taking an action, such as removing or rearranging the likely spoilt product, if the user device does not receive feedback within a threshold amount of time.

This disclosure generally describes computer-implemented methods, software, and systems for electrical power grid visualization. A computing system can receive various electrical power grid data from multiple sources. Power grid data can include different temporal and spatially dependent characteristics of a power grid. The characteristics can include, for example, power flow, voltage, power factor, feeder utilization, and transformer utilization. These characteristics can be coupled; for example, some characteristics may influence others and/or their temporal and spatial dependence may be related.

Data sources can include satellites, aerial image databases, publicly available government power grid databases, and utility provider databases. The sources can also include sensors installed within the electrical grid by the grid operator or by others, e.g., power meters, current meters, voltage meters, or other devices with sensing capabilities that are connected to the power grid. Data sources can include databases and sensors for both high voltage transmission and medium voltage distribution and low voltage utilization systems.

The data can include, but is not limited to, map data, transformer locations and capacities, feeder locations and capacities, load locations, or a combination thereof. The data can also include measured data from various points of the electrical grid, e.g., voltage, power, current, power factor, phase, and phase balance between lines. In some examples, the data can include historical measured power grid data. In some examples, the data can include real-time measured power grid data. In some examples, the data can include simulated data. In some examples, the data can include a combination of measured and simulated data.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any system or on the scope of what may be claimed, but rather as descriptions of features that may be specific to particular implementations of particular systems. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art.

For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

The invention claimed is:

1. A computer-implemented method executed by one or more processors, the method comprising:
obtaining, from one or more thermal cameras installed in a refrigerated case, a plurality of images of an inside of the refrigerated case;
determining, based on the plurality of images, a surface temperature of one or more products contained in the refrigerated case;
determining that the surface temperature of at least one product violated a spoilage temperature for a threshold period of time that is indicative of potential product spoilage; and
in response to determining that the surface temperature of the at least one product violated the spoilage temperature for the threshold period of time that is indicative of potential product spoilage, providing, for display on a user computing system, a graphical interface indicating that the at least one product is likely spoiled.

2. The method of claim 1, where determining the surface temperature of the one or more products comprises:
identifying a plurality of pixels associated with a product within at least one image of the plurality of images; and
determining the surface temperature of the product based on values of the plurality of pixels.

3. The method of claim 2, where determining the surface temperature of the product comprises determining an average of the values of the plurality of pixels; and
determining a temperature value associated with the average.

4. The method of claim 1, where determining that the surface temperature of the at least one product violated the spoilage temperature for the threshold period of time comprises:
determining, from the plurality of images, a location of the at least one product within the refrigerated case;
determining a type of the at least one product based on comparing the location of the at least one product to a planogram of the refrigerated case; and
determining that the surface temperature of the at least one product violated the spoilage temperature associated with the type of the at least one product.

5. The method of claim 4, where determining that the surface temperature of the at least one product violated the spoilage temperature associated with the type of the at least one product comprises:
identifying a plurality of pixels associated with the at least one product within a subset of images of the plurality of images;
determining the surface temperature of the at least one product based on values of the plurality of pixels;
determining that the surface temperature violated the spoilage temperature in more than one of the images of the subset of images; and
determining the time period that the surface temperature of the at least one product violated the spoilage temperature based on a number of the images in which the surface temperature violated the spoilage temperature and timestamps associated with each image.

6. A computer-implemented method executed by one or more processors, the method comprising:
obtaining, from one or more thermal cameras installed in a refrigerated case, a plurality of images of an inside of the refrigerated case;
determining, based on the plurality of images, a surface temperature of one or more products contained in the refrigerated case;
determining that the surface temperature of at least one product violated a spoilage temperature for a period of time, comprising:
determining, from the plurality of images, a location of the at least one product within the refrigerated case,
determining a type of the at least one product based on comparing the location of the at least one product to a planogram of the refrigerated case,
determining that the surface temperature of the at least one product violated the spoilage temperature associated with the type of the at least one product,
accessing a database comprising spoilage temperatures for a plurality of different products, and identifying the spoilage temperature associated with the type of the at least one product within the database; and in response to determining that the surface temperature of the at least one product violated the spoilage temperature for the period of time, providing, for display on a user computing system, a graphical interface indicating that the at least one product is likely spoiled.

7. The method of claim 1, further comprising generating, from the plurality of images, a profile of surface temperatures within the refrigerated case over the period of time.

8. The method of claim 7, where generating the profile of surface temperatures within the refrigerated case over threshold period of time comprises:

determining, based on pixel values within a first image, surface temperatures of products within the refrigerated case at a first time that is associated with the first image; and determining, based on pixel values within a second image, surface temperatures of products within the refrigerated case at a second time that is associated with the second image.

9. The method of claim 1, further comprising presenting, on a display associated with the refrigerated case, a graphical representation of surface temperatures within the refrigerated case overlaid on an image of a planogram of products within the refrigerated case.

10. The method of claim 1, further comprising controlling a robotic device associated with the refrigerated case to remove the at least one product that is likely spoiled.

11. A system comprising:

at least one processor; and a data store coupled to the at least one processor having instructions stored thereon which, when executed by the at least one processor, causes the at least one processor to perform operations comprising:

obtaining, from one or more thermal cameras installed in a refrigerated case, a plurality of images of an inside of the refrigerated case;

determining, based on the plurality of images, a surface temperature of one or more products contained in the refrigerated case;

determining that the surface temperature of at least one product violated a spoilage temperature for a threshold period of time that is indicative of potential product spoilage; and in response to determining that the surface temperature of at least one product violated the spoilage temperature for the threshold period of time that is indicative of potential product spoilage, providing, for display on a user computing system, a graphical interface indicating that the at least one product is likely spoiled.

12. The system of claim 11, where determining the surface temperature of the one or more products comprises:

identifying a plurality of pixels associated with a product within at least one image of the plurality of images; and determining the surface temperature of the product based on values of the plurality of pixels.

13. The system of claim 12, where determining the surface temperature of the product comprises determining an average of the values of the plurality of pixels; and determining a temperature value associated with the average.

14. The system of claim 11, where determining that the surface temperature of the at least one product violated the spoilage temperature for the threshold period of time comprises:

determining, from the plurality of images, a location of the at least one product within the refrigerated case;

determining a type of the at least one product based on comparing the location of the at least one product to a planogram of the refrigerated case; and determining that the surface temperature of the at least one product violated the spoilage temperature associated with the type of the at least one product.

15. The system of claim 14, where determining that the surface temperature of the at least one product violated the spoilage temperature associated with the type of the at least one product comprises:

identifying a plurality of pixels associated with the at least one product within a subset of images of the plurality of images;

determining a surface temperature of the at least one product based on values of the plurality of pixels;

determining that the surface temperature violated the spoilage temperature in more than one of the images of the subset of images; and determining the time period that the surface temperature of at least one product violated the spoilage temperature based on a number of the images in which the surface temperature violated the spoilage temperature and timestamps associated with each image.

16. The system of claim 14, where determining that the surface temperature of the at least one product violated the spoilage temperature associated with the type of the at least one product comprises:

accessing a database comprising spoilage temperatures for a plurality of different products; and identifying the spoilage temperature associated with the type of the at least one product within the database.

17. The system of claim 11, where the operations further comprise generating, from the plurality of images, a profile of surface temperatures within the refrigerated case over a period of time.

18. The system of claim 17, where generating the profile of surface temperatures within the refrigerated case over the threshold period of time comprises:

determining, based on pixel values within a first image, surface temperatures of products within the refrigerated case at a first time that is associated with the first image; and determining, based on pixel values within a second image, surface temperatures of products within the refrigerated case at a second time that is associated with the second image.

19. The system of claim 11, where the operations further comprise presenting, on a display associated with the refrigerated case, a graphical representation of surface temperatures within the refrigerated case overlaid on an image of a planogram of products within the refrigerated display case.

* * * * *